(12) United States Patent
Suzuki

(10) Patent No.: US 7,128,114 B2
(45) Date of Patent: Oct. 31, 2006

(54) PNEUMATIC TIRE AND METHOD OF MANUFACTURING THE TIRE

(75) Inventor: Kazuya Suzuki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 111 days.

(21) Appl. No.: 10/398,719

(22) PCT Filed: May 20, 2002

(86) PCT No.: PCT/JP02/04867

§ 371 (c)(1),
(2), (4) Date: Apr. 9, 2003

(87) PCT Pub. No.: WO02/096676

PCT Pub. Date: Dec. 5, 2002

(65) Prior Publication Data

US 2004/0055689 A1    Mar. 25, 2004

(30) Foreign Application Priority Data

May 29, 2001    (JP)    ............................. 2001-161186

(51) Int. Cl.
*B60C 9/10* (2006.01)
*B60C 15/06* (2006.01)

(52) U.S. Cl. ...................................... 152/557; 152/541

(58) Field of Classification Search ................ 152/539, 152/541–543, 546–548, 552, 554–556, 557
See application file for complete search history.

(56) References Cited

U.S. PATENT DOCUMENTS

| 1,899,088 | A | * | 2/1933 | Geer .......................... 156/131 |
| 2,966,933 | A | * | 1/1961 | Saint-Frison et al. ........ 152/540 |
| 4,023,608 | A | * | 5/1977 | Meiss .......................... 152/541 |
| 4,177,852 | A | * | 12/1979 | Merli et al. ................. 152/550 |
| 4,436,130 | A | * | 3/1984 | Suzuki et al. ............... 152/525 |
| 5,007,472 | A | * | 4/1991 | Kuze et al. ................. 152/546 |
| 5,526,863 | A | * | 6/1996 | Hodges ....................... 152/541 |
| 5,656,108 | A | * | 8/1997 | Sakamoto et al. .......... 152/557 |
| 5,879,482 | A |   | 3/1999 | Rooney et al. |
| 6,053,229 | A | * | 4/2000 | Suzuki ....................... 152/541 |
| 6,135,184 | A | * | 10/2000 | Fyfe ........................... 152/550 |
| 6,543,504 | B1 | * | 4/2003 | Auxerre ...................... 152/547 |
| 6,598,642 | B1 | * | 7/2003 | Hirai .......................... 152/539 |
| 6,613,173 | B1 | * | 9/2003 | Ogawa ........................ 156/117 |
| 6,732,776 | B1 | * | 5/2004 | Mani et al. ................. 152/541 |
| 6,766,839 | B1 | * | 7/2004 | Caretta ....................... 152/454 |

FOREIGN PATENT DOCUMENTS

DE             3631736 A1 *  3/1988    ................. 152/539

(Continued)

*Primary Examiner*—Jason R. Bellinger
(74) *Attorney, Agent, or Firm*—Birch, Stewart, Kolasch & Birch, LLP

(57) ABSTRACT

A carcass 7 includes first and second carcass plies 9 and 10. The first carcass ply 9 has a body portion 9A extending from a tread portion 2 to a bead core 5 through a sidewall portion 3, and a wound up portion 9B which is folded back from inside to outside around the bead core 5. The body portion 9A is provided with the wound up portion 9B. The second carcass ply 10 includes an inserting portion 10B2 which passes between a wound up portion 9B and the body portion 9A of the first carcass ply 9 from the tread portion 2 through the sidewall portion 3. The inserting portion 10B2 enters a bead apex 6 and is terminated therein.

6 Claims, 5 Drawing Sheets

FOREIGN PATENT DOCUMENTS

| | | |
|---|---|---|
| JP | 6-344711 A | 12/1994 |
| JP | 2000-264025 A | 9/2000 |
| JP | 2001-30722 A | 2/2001 |
| WO | WO 98/56602 A1 | 12/1998 |

* cited by examiner

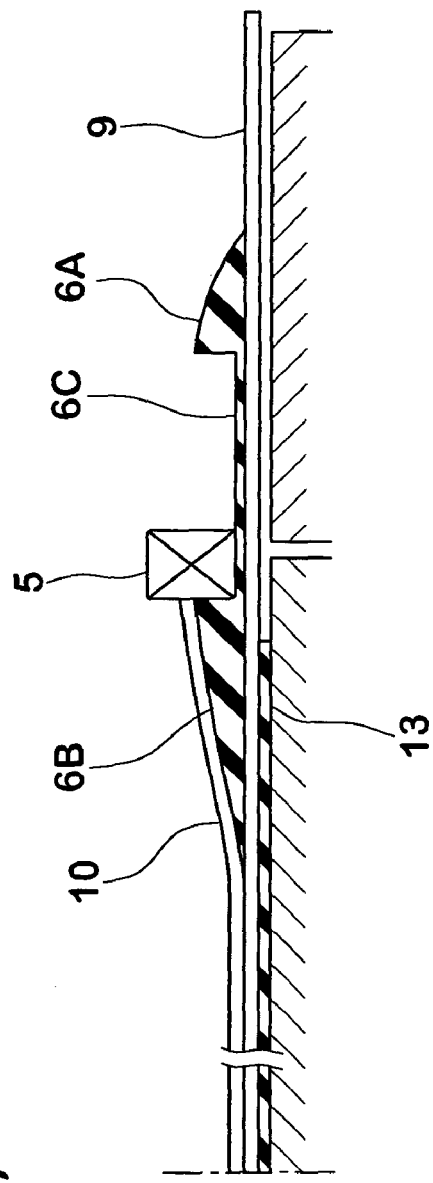
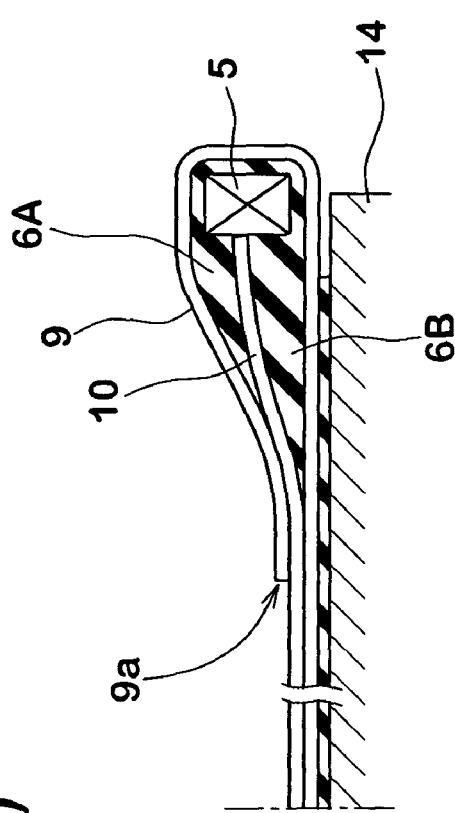
Fig.4(a)
Fig.4(b)

PNEUMATIC TIRE AND METHOD OF MANUFACTURING THE TIRE

This application is the national phase under 35 U.S.C. § 371 of PCT International Application No. PCT/JP02/04867 which has an International filing date of May 20, 2002, which designated the United States of America.

FIELD OF THE INVENTION

The present invention relates to a pneumatic tire having enhanced steering stability, and a producing method thereof.

BACKGROUND ART

In recent years, with high performance tendency of automobiles, tires are required to have high steering stability and enhanced riding comfort, and it is required to reduce weight of tires in view of resource conservation concerning environmental problem.

On the other hand, in the case of a pneumatic tire, especially pneumatic radial tire, it is known that if lateral rigidity of the tire is increased, the steering stability can be enhanced. For this reason, in order to increase bending rigidity of a sidewall portion of the tire, there exists a so-called 1—1 structure in which a carcass comprises two carcass plies, one of the carcass plies is wound up from inside to outside of a bead core in an axial direction of the tire, and a lower portion of the other carcass ply is wound down outside of a bead apex in the tire axial direction.

According to this structure, since the two carcass plies sandwich the bead apex, when bending deformation is applied to the bead portion of the tire by stress in the tire axial direction, compressive force is applied to one of the carcass plies and tensile force is applied to the other carcass ply. Therefore, a neutral line of bending is located in the bead apex which is made of hard rubber, and lateral bending rigidity is increased, and the steering stability is enhanced.

However, in the outer carcass ply in the tire axial direction which was wound down, conventionally, when a lower end edge of the wound down portion is located at a tire radially outer side of the bead core, the lower portion is located outside of the wound up portion of the first carcass ply in the tire axial direction, or between the wound up portion and the bead apex.

In such a structure, however, the lower end edge of the wound down carcass ply is prone to be close to a free end, and the lower end edge can not sufficiently endure the tensile force when bending deformation is applied to the bead portion, and the carcass ply can not contribute to enhancement of lateral rigidity of the tire as compared with a carcass ply which is retained by the bead core.

If the wound down carcass ply is wound from tire radially inward of the bead core to inner side in the tire axial direction and is retained, and a fixing strength at the bead portion is enhanced, it is possible to enhance the lateral rigidity, but assembling of parts when tire is formed becomes difficult, productivity is lowered, and since the length of the carcass ply is increased, a tire weight is also increased.

It is a well known technique to dispose, in the bead portion, a reinforcing layer made of cord material having high rigidity such as metal cord, thereby enhancing the bending rigidity of the tire, but increase in tire weight can not be avoided, riding comfort is deteriorated in generally, and there are many tires which do not have such reinforcing layer.

Japanese Patent Application Laid-open No. H6-344711 proposes a structure in which a wound down carcass ply is folded outside of the bead apex in the tire axial direction, thereby enhancing the rigidity of the bead portion. According to this proposed structure, the tire can be reduced in weight as compared with a tire using the reinforcing layer, the sandwiching pressure degree can be increased at the bead portion by the folding and the fixing strength can be enhanced to some degree, but it is desired to further enhance the fixing strength.

DISCLOSURE OF THE INVENTION

Thereupon, based on a structure in which a lower portion of a wound down carcass ply is disposed in a bead apex, it is an object of the present invention to provide a pneumatic tire in which a fixing strength at the bead portion is increased to enhance the rigidity of the bead portion and lateral rigidity of the tire without deteriorating the riding comfort and increasing the tire weight. It is also an object of the invention to provide a producing method of such pneumatic tire.

A first invention of the present invention provides a pneumatic tire having a carcass, in which the carcass comprises a first carcass ply in which a body portion extending from a tread portion to a bead core of a bead portion through a sidewall portion has a wound up portion which is folded back from inside to outside around the bead core, and a second carcass ply passing between the body portion of the first carcass ply and wound up portion from the tread portion through the sidewall portion, wherein the wound up portion of the first carcass ply is disposed outside in a tire axial direction of the bead apex which extends from the bead core radially outward of the tire, the wound up portion extends radially outward, a lower portion of the second carcass ply includes an inserting portion which enters in the bead apex and terminated therein, the lower portion is continuously provided on the body portion which extends to a bead apex upper end.

With this structure, at least a portion of the bead apex made of hard rubber is sandwiched between the first and second carcass plies, and since the bead apex is strongly fixed, a tensile force is held, the lateral bending rigidity of the bead portion is enhanced, and steering stability can be enhanced without increasing its weight. Since vertical rigidity of the tire can be maintained, almost no influence is generated on riding comfort.

A second invention of the present invention provides a producing method of the pneumatic tire, the method comprises:

a first loading step for loading an inner liner, said first carcass ply, an inner bead apex portion forming an inside portion of said bead apex in the tire axial direction, and said bead core on a former, a second loading step for loading said second carcass ply outside of said inner bead apex portion, and a covering step at least a portion of an outside portion of said second carcass ply with an outer bead apex portion forming an outside portion of said bead apex in the tire axial direction, and with a wound up portion of said first carcass ply which comes out from said bead core in the axial direction.

BRIEF DESCRIPTION OF THE DRAWINGS

FIGS. 4(a) and 4(b) are diagram showing another forming steps.

BEST MODE FOR CARRYING OUT THE INVENTION

An embodiment of the present invention will be explained below based on the drawings.

Figure 1:
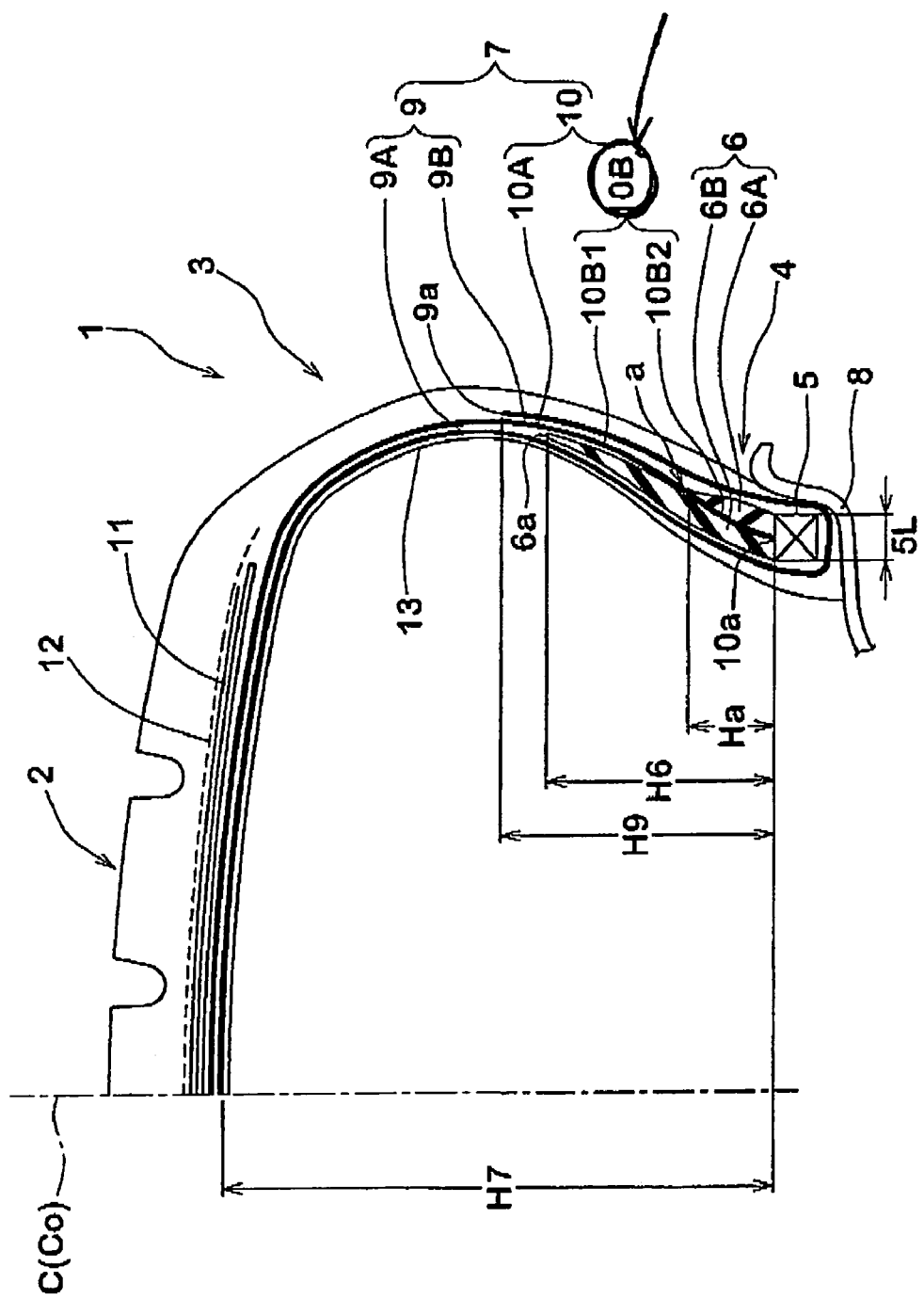
FIG. 1 is a sectional view of a right half of a tire according to an embodiment of the present invention.

In FIG. 1, a pneumatic tire 1 is assembled to a normal rim 8 and a normal internal pressure is charged into the tire, while taking the case of a radial tire for a passenger car, but the pneumatic tire 1 can also be applied to various tires such as a small truck tire, a truck tire and a motorcycle tire. In this specification, the "normal rim" is determined in accordance with any one of a standard rim defined by JATMA, a "Design Rim" defined by TRA, and a "Measuring Rim" defined by ETRTO. The "normal internal pressure" is an air pressure defined by any one of a maximum air pressure defined by JATMA, a maximum value described in a table "TIRE LOAD LIMITS AT VARIOUS COLD INFLATION PRESSURES" defined by TRA, and "INFLATION PRESSURE" defined by ETRTO.

The pneumatic tire 1 comprises a tread portion 2 forming a tread surface, sidewall portions 3 on the opposite sides of the tread portion 2, and bead portions 4 located radially inward of the sidewall portions 3. A bead core 5 formed by spirally winding a metal wire several times is disposed in the bead portion 4, and a bead apex 6 is disposed radially outside of the tire of the bead core 5.

The pneumatic tire 1 has a carcass 7. The carcass 7 comprises a first carcass ply 9 in which a body portion 9A extending from the tread portion 2 to a bead core 5 of a bead portion 4 through a sidewall portion 3 is continuously provided with a wound up portion 9B which is folded back from inside to outside in the tire axial direction around the bead core 5, and a second carcass ply 10 disposed radially outward of the tire with respect to the first carcass ply 9 and having a body portion 10A extending from the tread portion 2 to an upper end 6a of the bead apex 6 through the sidewall portion 3 and the body portion 10A is provided with a lower portion 10B. In this example, the second carcass ply 10 is of a 1—1 structure in which the second carcass ply 10 is wound down between the body portion 9A and the wound up portion 9B of the first carcass ply. The number of first or second carcass ply (9 or 10) may be two or more.

In the bead apex 6 of this example, a bead apex height H6 which is a distance in the tire radial direction from an upper surface of the bead core 5 (from central point 5c in the tire axial direction when the upper surface is inclined) to the upper end 6a is set to a higher value than that of a normal tire as high as about 25 to 55% of a carcass height H7 from the upper surface of the bead core 5 to a point of a tire equator surface C of an inner surface of the carcass 7.

Further, a height H9 from the upper surface of the bead core 5 to an upper end 9a of the wound up portion 9B of the first carcass ply 9 is set to about 30 to 60% of the carcass height H7. The wound up portion 9B may extend below the tread portion 2 but generally, if the height H9 exceeds 60%, a weight of the tire is increased, vertical rigidity is increased, and riding comfort is prone to be deteriorated. Further, in a region of tire maximum width position, a large bending stress is prone to be applied, and it is preferable locate the upper end 9a of the wound up portion 9B in a region of 3% of the carcass height H7 around this region and more preferably, 5% of the carcass height H7. If this value is less than 25%, lateral rigidity of the bead portion 4 is lowered, and steering stability is deteriorated.

Preferably, the height H9 to the upper end 9a of the wound up portion 9B of the first carcass ply 9 is greater than the bead apex height H6 by about 4 to 24% of the height H6. With this design, the body portion 9A and the wound up portion 9B are adjacent to each other through the second carcass ply 10, this is of use in strongly holding the second carcass ply 10.

The bead apex 6 is made of hard rubber having durometer A hardness of 75 to 95°. The sidewall rubber of the sidewall portion 3 is made of rubber having hardness of 50 to 60°. In this specification, the hardness means durometer A hardness, and is defined as durometer type A based on JIS-K6253.

In this embodiment, the lower portion 10B of the second carcass ply 10 comprises a covering portion 10B1 which passes between the outer side surface of the bead apex 6 and the wound up portion 9B radially inward from the upper end 6a of the bead apex 6, and an inserting portion 10B2 which is inserted into the bead apex 6 from an inlet a formed in a lower end of the covering portion 10B1 and is terminated. An inserting height Ha of the inserting portion 10B2 from an upper surface of the bead core 5, i.e., inserting height Ha of the inlet a from the upper surface of the bead core 5 can be 0.2 to 1.0 times (preferably about 0.25 to 0.7 times) of the bead apex height H6. If the inserting height Ha is smaller than 0.2 Ha, fixing effect at the bead apex 6 by the inserting portion 10B2 is inferior. If this value is preferably set to about 0.25 to 0.7 times as described above, the fixing effect as well as sandwiching effect of the bead apex 6 by the first and second carcass plies 9 and 10 can effectively be exhibited.

Figure 2:
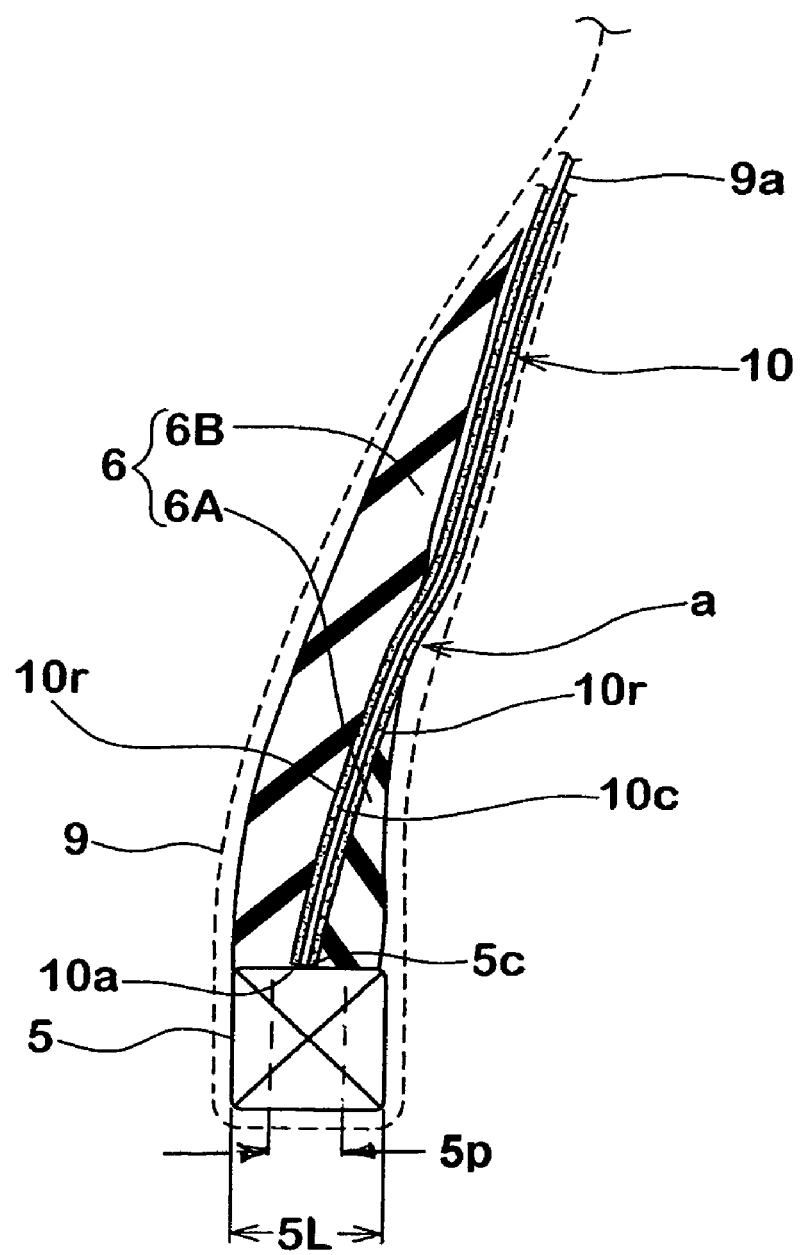
FIG. 2 is an enlarged sectional view of a bead portion of the tire.

As shown in FIG. 2 in an enlarged manner, the inserting portion 10B2 is inserted at substantially intermediate height of the bead apex 6 as the inlet a, and a position of the end edge 10a is located in a range 5p from a tire axial direction central point 5c of the bead core 5 to a position away from the central point 5c in the tire axial direction by a distance of ¼ times (preferably ⅙ times) of a tire axial direction length 5L, and preferably the position of the end edge 10a is located in the vicinity of the central point 5c. With this design, fixing effect by the bead apex 6 can be enhanced.

In this embodiment, the end edge 10a is in contact with an upper surface of the bead core 5. With this design, the bead apex 6 is divided into an outer bead apex portion 6A and an inner bead apex portion 6B in the tire axial direction, and the inserting portion 10B2 is fixed over the entire height of the inserting height Ha. When the end edge height H10a (shown in FIG. 5) in the radial direction between the end edge 10a and the upper surface of the bead core 5 is set to about 0 to 0.2 times of the bead apex height H6 and a gap is formed, the bead apex 6 can integrally be formed inside and outside of the inserting portion 10B2, which can contribute to enhancement of the rigidity. In the inserting portion 10B2, if a portion between the inlet a and the end edge 10a is made straight and no looseness is generated, extensibility at the time of tension is reduced, and the fixing effect can be maintained or enhanced.

In the embodiment shown in FIG. 1, in the outer bead apex portion 6A and the inner bead apex portion 6B, the outer bead apex portion 6A is made of hard rubber having hardness of 85 to 95° for example, thereby enhancing the fixing strength of the second carcass ply 10, and the hardness of the inner bead apex portion 6B is set to 75 to 85°, so that bending or deforming of the sidewall portion 3 is facilitated, thereby enhancing the riding comfort.

Each of the first carcass ply 9 and the second carcass ply 10 of the carcass 7 is made of organic fiber cord such as nylon, polyester, rayon and aromatic polyamide, and has carcass cords 10c (shown in FIG. 2) radially arranged in parallel to each other at an angle of 80 to 90° with respect to the tire equator CO. The carcass cords 10c are lined up to form a cord parallel body, and this is embedded in a carcass topping rubber layer 10r, and the outer bead apex portion 6A and the inner bead apex portion 6B are coupled and fixed to each other through the carcass topping rubber layer 10r. The pneumatic tire 1 includes an inner liner 13 disposed on a tire lumen surface and made of rubber such as butyl rubber through which air can hardly pass, a belt layer 11 disposed on the tread portion 2, and a band layer 12 superposed on the outer side of the belt layer 11. A chafer (not shown) for preventing deviation with respect to the rim can be disposed on a contact surface of the bead portion 4 with respect to the rim 8.

The belt layer 11 is formed by superposing a plurality of (two, in this example) belt plies made of organic fiber cord such as nylon, rayon, aromatic polyamide fiber arranged at an angle of 15 to 35° with respect to the tire equator CO, thereby enhancing the rigidity of the tread portion 2. The band layer 12 comprises one band ply covering the entire surface of the belt layer 11. The band layer 12 is formed by spirally winding a long and narrow band-like ply made of one or more organic fiber cords such as nylon, aromatic polyamide fiber coated with topping rubber. High load resistance and endurance are enhanced by preventing the lifting of the belt layer 11 at the time of high speed running, by enhancing high speed performance, and by preventing the belt layer 11 from being peeled off.

FIG. 3 shows one example of a producing method of the pneumatic tire 1 having the above-described bead portion structure.

(1) First Stage

Figure 3A:
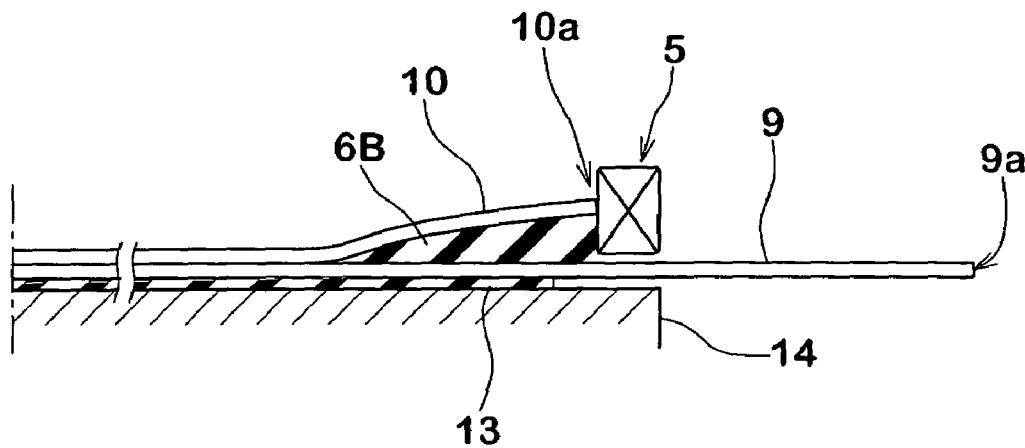
FIGS. 3(a) to 3(c) are diagrams of forming steps of the bead portion.

As shown in FIG. 3(a), the inner liner 13, the first carcass ply 9, the inner bead apex portion 6B and the bead core 5 are laminated on a former 14 in this order (first loading step). Here, it is preferable that the bead core 5 and the inner side of the inner bead apex portion 6B are previously assembled to each other as a pair. Then, the second carcass ply 10 is mounted such that its end edge 10a reaches the bead core 5 (second loading step).

(2) Second Stage

Figure 3B:
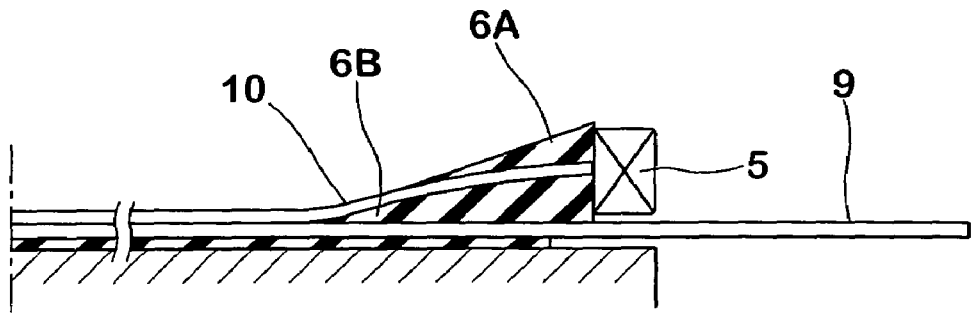
Figure 3C:
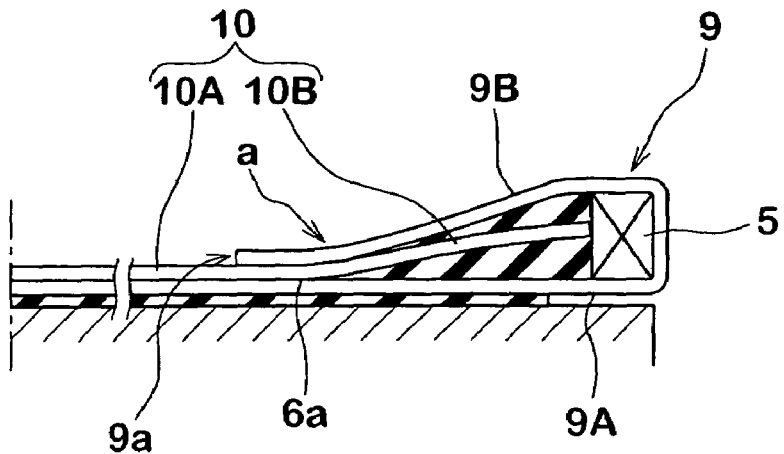

As shown in FIG. 3(b), the outer bead apex portion 6A is placed on the second carcass ply 10 such that the bead apex portion 6A comes into contact with the bead core 5. Then, as shown in FIG. 3(c), the first carcass ply 9 is wound around the bead core 5 to cover the outer bead apex portion 6A such that the upper end 9a of the first carcass ply 9 comes closer to a center of the former than the upper end 6a of the bead apex portion 6B (covering step).

In this step, the inner and outer bead apex portions 6A and 6B may be made of the same material or different material.

FIGS. 4 show an example of other steps.

(1) First Stage

As shown in FIG. 4(a), the inner liner 13, the first carcass ply 9, the bead apex 6, the bead core 5 and the second carcass ply 10 are placed on the former 14 in this order (first and second loading steps). Here, the rubber of the bead apex 6 is a rubber-molded product formed by connecting the outer and inner bead apex portions 6A and 6B through a thin joint portion 6C.

(2) Second Stage

As shown in FIG. 4(b), the first carcass ply 9 and the outer bead apex portion 6A are integrally wound up simultaneously, the outer bead apex portion 6A is formed, and the second carcass ply 10 is sandwiched between the outer and inner bead apex portions 6A and 6B (covering step).

Figure 6:
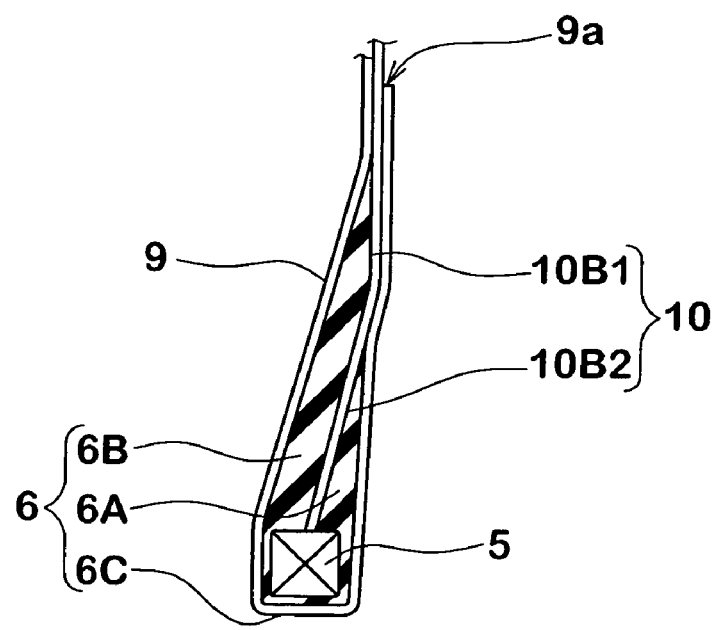
FIG. 6 is a sectional view showing further another embodiment of the bead portion.

FIG. 6 shows the bead portion of the pneumatic tire 1 produced by the above steps. The bead apex 6 entirely made of the same rubber and fixing the second carcass ply 10 is formed around the bead core 5. This step can prevent a dividing step of the bead apex 6.

Figure 5:
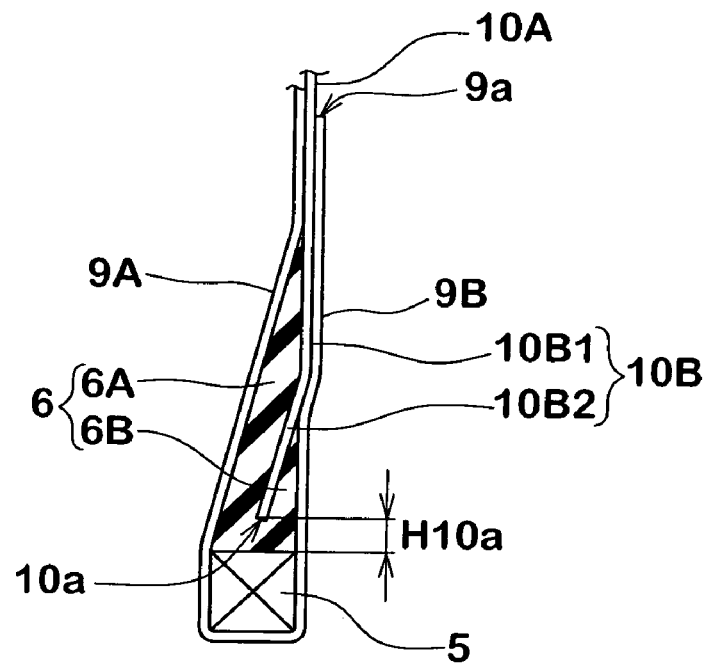
FIG. 5 is a sectional view showing another embodiment of the bead portion.

FIG. 5 shows a case in which a second carcass ply end edge 10a is formed by separating the same from an upper surface of the bead core 5 by a height H10a, and this can be formed by any steps shown in FIGS. 3 and 4.

Concrete Example

Tires having size of 205/55R16 and structure shown in FIG. 1 were prototyped, and test concerning performance of the tires was carried out. The tires were mounted to a Japanese passenger car, the car was allowed to run on a test course, and a driver's sensory evaluation was indicated with indices with 10 point scoring while defining a comparative example 1 as being 5. The higher the numerical value, more excellent the result is. Results of the test are shown in Table 1.

|  | Comparative example 1 | Embodiment 1 | Embodiment 2 | Embodiment 3 | Embodiment 4 | Embodiment 5 |
|---|---|---|---|---|---|---|
| Tire size | 205/55R16 | | | | | |
| Drawing showing structure | — | FIG. 1 | | | | |
| Inserting height Ha of second carcass ply [mm] | 0 | 7 | 10 | 15 | 20 | 3 |
| Height H6 of bead apex [mm] | 35 | | | | | |
| Ratio Ha/H6 | 0 | 0.2 | 0.28 | 0.42 | 0.57 | 0.08 |
| Steering stability | 5 | 7 | 7 | 7 | 6 | 6 |
| Riding comfort | 5 | 5 | 5 | 5 | 5 | 5 |

In Table 1, the steering stability and riding comfort were measured in the following manner:

(1) Steering Stability

The test tires were mounted to four wheels of a Japanese FF car, the car was allowed to run on a tire test course having dry asphalt road surface, characteristics concerning steering wheel response, rigidity feeling, grip and the like were indicated with indices with driver's sensory evaluation while defining the comparative example 1 as being 100. The higher the numerical value, more excellent the result is.

(2) Riding Comfort

Like the above test, on bumps of dry asphalt roar surface, Belgian road (road surface stone pavement), Bitzmen road (pebble road surface) and the like, sensory evaluation concerning rhino-hide feeling, toss up and damping was carried out, results were indicated with indices while defining the comparative example 1 as being 100. The higher the numerical value, more excellent the result is.

As a result of the test, it was confirmed that tires of the embodiments were excellent in steering stability, and riding comfort was not inferior.

INDUSTRIAL APPLICABILITY

As explained above, according to the pneumatic tire of the present invention, it is possible to enhance the steering stability while maintaining the riding comfort, and the invention can be preferably applied to various tires such as passenger car tires, small truck tires, truck tires and motorcycle tires.

The invention claimed is:

1. A pneumatic tire having a carcass, in which the carcass comprises a first carcass ply in which a body portion extending from a tread portion to a bead core of a bead portion through a sidewall portion has a wound up portion which is folded back from inside to outside around said bead core, and a second carcass ply extending from the tread portion through the sidewall portion and passing between said body portion of said first carcass ply and said wound up portion, wherein:

said wound up portion of said first carcass ply is disposed outside in a tire axial direction of a bead apex which extends from said bead core radially outward of the tire, said second carcass ply is located in its entirety radially outward of said bead core, whereby no portion of said second carcass ply is folded around said bead core, and a lower portion of said second carcass ply includes (1) a covering portion which extends radially inward of the tire from a radially outer end of said bead apex along an axially outer side surface of said bead apex and (2) an inserting portion which enters in said bead apex from a radially inner end of said covering portion, is wholly disposed within said bead apex and is terminated in said bead apex.

2. A pneumatic tire according to claim 1, wherein a radial height (Ha) from a radially outer surface of said bead core to the radially outermost end of said inserting portion is 0.2 to 1.0 times of a radial height (H6) from the radially outer surface of said bead core to the radially outer end of said bead apex.

3. A pneumatic tire according to claim 1, wherein a radial height (H10a) between a radially inner end of said lower portion and a radially outer surface of said bead core is 0 to 0.2 times of a radial height (H6) from the radially outer surface of said bead core to the radially outer end of said bead apex, and an axial distance between the radially inner end of said lower portion and an axial center point of the radially outer surface of said bead core is 0 to 0.25 times of an axial width of the radially outer surface of said bead core.

4. A producing method of a pneumatic tire having a first carcass ply in which a body portion extending from a tread portion to a bead core of a bead portion through a sidewall portion has a wound up portion which is folded back from inside to outside around said bead core, and a second carcass ply passing between said body portion of said first carcass ply and said wound up portion from the tread portion through the sidewall portion, the second carcass ply having an inserting portion which enters the bead apex and terminates therein, wherein said method comprises:

a first loading step for loading an inner liner, said first carcass ply, an inner bead apex portion forming an inside portion of said bead apex in the tire axial direction, and said bead core on a cylindrical tire forming drum, a second loading step for loading said second carcass ply on a radially outer surface of said first carcass ply and a radially outer surface of said inner bead apex portion with said second carcass ply located in its entirety inward of said bead core in the axial direction of said drum, and a covering step for covering at least a portion of an outside portion of said second carcass ply in the drum axial direction with an outer bead apex portion forming an outside portion of said bead apex in the tire axial direction, and with a portion of said first carcass ply protruding outwardly from said bead core in the drum axial direction, said protruding portion being wound up around said bead core so as to make a wound up portion.

5. A producing method of a pneumatic tire according to claim 4, wherein in said covering step, after said outer bead apex portion is placed on the at least a portion of the outside portion of said second carcass ply, the protruding portion of said first carcass ply is wound up.

6. A producing method of a pneumatic tire according to claim 4, wherein in said first loading step, the inner bead apex rubber portion which is connected to the outer bead apex portion located on said protruding portion through a joint portion passing radially inside said bead core is used, and in said covering step, the protruding portion of said first carcass ply is wound up, and said outer bead apex portion is disposed radially outside of said second carcass ply.

* * * * *